(No Model.)

E. ALLEN.
CIRCULAR SAW.

No. 318,938. Patented June 2, 1885.

Witnesses —
Frank H. Allen
Tyler J. Howard.

Inventor —
Edwin Allen

UNITED STATES PATENT OFFICE.

EDWIN ALLEN, OF NORWICH, CONNECTICUT.

CIRCULAR SAW.

SPECIFICATION forming part of Letters Patent No. 318,938, dated June 2, 1885.

Application filed September 27, 1884. (No model.)

*To all whom it may concern:*

Figure 1:
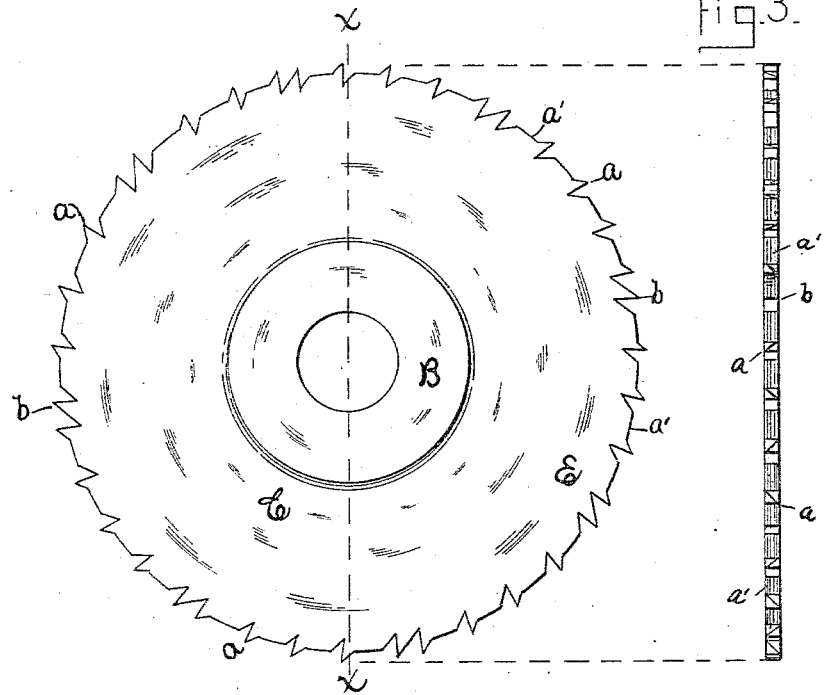
Figure 3:
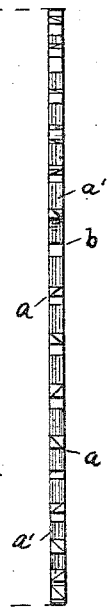
Figure 2:

Be it known that I, EDWIN ALLEN, of the city of Norwich, county of New London, and State of Connecticut, have invented certain new and useful Improvements in Saws, which improvements are fully set forth and described in the following specification, reference being had to the drawings which form a part of and accompany said specification.
My invention relates more particularly to circular saws, my object being to improve somewhat the form of tooth used, and also to strengthen the saw-plate, as hereinafter fully described.
Figure 1 in the annexed drawings is a side view of my improved saw. Fig. 2 is a cross-section on line $x\ x$, and Fig. 3 a projection of Fig. 1.

My saw-plate is so ground that a hub, B, with parallel sides, is left near the central portion. From hub B outward said plate is reduced in thickness, the inner half (or thereabout) being ground with parallel sides C, and the outer remaining half, E, being tapered, leaving the face or periphery of the saw of the same thickness as the hub B. The connecting portion between the hub B and reduced part C is hollowed or rounded, as shown in Fig. 2, to give strength.
I am aware that circular saws have been for some time in common use in which the plate is tapered gradually from the central (arbor) hole outward, and also those in which a hub with parallel sides is used; but in the latter case the tapered portion begins at the circumference of the hub and extends to the periphery of the plate. In using such forms of plates for sawing extremely delicate work I have found a tendency to spring and wabble, which the straight portion C of my device in a large degree prevents.

The teeth of my saw are preferably of two forms, as shown at $a$ and $b$. $b$ represents a channeling or clearing tooth of the full thickness of the saw-plate, one of such teeth being arranged to follow every fourth or fifth cutting-tooth. The clearing-teeth $b$ could be dispensed with and a very good result obtained; but I prefer to use them in about the proportion named. The cutting-teeth $a$ are filed alternately right and left hand, the actual cutting-edge being the full depth of the clearing-teeth $b$. The back of said tooth $a$ is cut down to about one-half the depth of the front or cutting side, the remaining portion, $a'$, being considerably elongated, occupying the space usually covered by two or more teeth, and so shaped that it forms an arc of a circle somewhat less than the circle described by the cutting-points of the several teeth. This elongated backing $a'$, formed as a part of each cutting-tooth, serves as a guide to keep the teeth revolving continuously in the same plane, and adds materially to the gathering-spaces between the teeth.

My saw works equally well as a cutting-off saw or as a splitting-saw, clearing itself quickly and leaving the cut surfaces very smooth.

Having thus described my invention, I claim—

1. A saw having sets of cutting-teeth $a$, sharpened on alternately opposite edges, and having an occasional clearing-tooth, $b$, all formed as integral parts of the same plate, tooth $a$ being cut away on its rear side but half the depth of its cutting or front edge, the outer edge of the elongated portion $a'$ being concentric with the circle described by the cutting-points of teeth $a$, all substantially as and for the purpose specified.

2. A circular-saw plate having the cutting portion E tapered inwardly from its periphery, the centrally-perforated hub portion B, with parallel sides, and the straight portion C, concentric with and intervening between portions E and B, said intervening portion, C, being of equal thickness throughout its entire width, and with sides parallel to the sides of the hub portion, as described, and for the object set forth.

EDWIN ALLEN.

Witnesses:
FRANK H. ALLEN,
TYLER J. HOWARD.